US008435407B2

(12) United States Patent
Kluson-Heβlinger et al.

(10) Patent No.: US 8,435,407 B2

(45) Date of Patent: May 7, 2013

(54) FUEL FILTER OF A MOTOR VEHICLE

(76) Inventors: Heike Kluson-Heβlinger, Freiberg (DE); Gunther Kraft, Ludwigsburg (DE)

( * ) Notice: Subject to any disclaimer, the term of this patent is extended or adjusted under 35 U.S.C. 154(b) by 796 days.

(21) Appl. No.: 12/535,989

(22) Filed: Aug. 5, 2009

(65) Prior Publication Data

US 2010/0032360 A1 Feb. 11, 2010

(30) Foreign Application Priority Data

Aug. 7, 2008 (DE) .................... 20 2008 010 506 U

(51) Int. Cl.
*B01D 35/30* (2006.01)
*B01D 35/31* (2006.01)

(52) U.S. Cl.
USPC ........................................................ 210/232

(58) Field of Classification Search .................. 210/232
See application file for complete search history.

(56) References Cited

U.S. PATENT DOCUMENTS 5,855,772 A * 1/1999 Miller et al. .................... 210/86
6,173,859 B1 * 1/2001 Schumann et al. ........... 220/672

FOREIGN PATENT DOCUMENTS

DE 3527802 A1 * 2/1987
FR 2544021 A1 * 10/1984

* cited by examiner

*Primary Examiner* — Thomas M Lithgow
(74) *Attorney, Agent, or Firm* — James Hasselbeck

(57) ABSTRACT

A fuel filter of a motor vehicle is designed to be mounted in a traveling direction of the motor vehicle and has a filter housing with a housing base body. The housing base body has a front side facing in the traveling direction. The front side of the housing base body has an external, integrally formed rib structure configured and adapted as impact protection.

13 Claims, 2 Drawing Sheets

FUEL FILTER OF A MOTOR VEHICLE

CROSS REFERENCE TO RELATED APPLICATIONS

This application claims the benefit under 35 USC 119 of the filing date of Federal Republic of Germany patent application no. DE 202008010506.4 filed Aug. 7, 2008, the entire disclosure of which is incorporated herein by reference.

TECHNICAL FIELD

This disclosure relates to a fuel filter of a motor vehicle.

BACKGROUND OF THE INVENTION

The invention relates to a fuel filter of a motor vehicle which fuel filter is adapted for being mounted in a traveling direction of the motor vehicle and comprises a filter housing with a housing base body. The housing base body has a front side that is facing in the traveling direction.

Motor vehicles are provided with fuel filters for filtering the fuel supplied to the drive motor, wherein fuel filters of the aforementioned kind are mounted fixedly in the vehicle in a certain spatial orientation relative to the traveling direction of the vehicle. The available mounting space in the engine compartment is becoming increasingly tight and, as a result, such fuel filters are installed very close to the front end in the engine compartment where they are exposed to potential damage from crash loads. Appropriate mounting requirements and customer demands require a certain level of crash safety according to which the housing of the fuel filter must remain intact up to a predetermined level of crash-caused impact loading at least to such an extent that no leaks will occur and that no fuel will escape.

To meet these requirements, the filter housing may be manufactured of sheet metal that will deform or yield. This enables, in a crash situation, a plastic deformation without causing leakage. A disadvantage is in the high manufacturing costs.

Preferably, at least the housing base body is produced by casting technology, for example, by aluminum die casting. In this way, cost-efficient complex geometric structures can be realized. A comparable situation exists for housing base bodies made by aluminum extrusion or by injection molding of plastic material. Such components are however relatively brittle and have no appreciable plastic yielding properties relevant in a crash situation. Therefore, special protective measures are required for protecting the filter housing with regard to impact loads. In prior art configurations, at the front end of the housing base body in the traveling direction, crash armor is mounted as a separate component for this purpose. Such a component is effective with regard to its function but causes additional costs and undesirable additional weight.

It is therefore an object of the present invention to further develop a fuel filter of the aforementioned kind in such a way that with simple means an improved safety with regard to impact loads is provided.

SUMMARY OF THE INVENTION

According to the present invention, this object is solved in that the housing base body at its front side is provided with a rib structure as an impact protection in which the rib structure is integrally formed onto the exterior of the front side.

A fuel filter is proposed whose housing base body is provided externally at the front side with an integrally formed rib structure in the vehicle traveling direction or in potential force-loading direction in which the rib structure provides impact protection. Preferably, the rib structure is distributed across a rib surface area that is at least 80% and in particular at least 100% of a longitudinal section surface area of the filter interior of the housing base body as viewed in a direction opposite to the traveling direction or force loading direction. In the case of a suitable configuration, the rib structure is able to compensate point-shaped as well as more widely distributed impact loads. As a result of the integrally formed configuration these impact loads are distributed into the supporting walls of the housing base body while stress peaks are avoided. The aforementioned defined minimal size of the rib surface area contributes also to the prevention of stress peaks. Even for brittle materials such as die cast aluminum, crack formation under impact load is reliably prevented. The rib structure can be thin-walled and thus embodied in a material-saving way. Additional components such as separate crash armor are not required. As a whole, the invention yields an inexpensive lightweight configuration with high crash safety.

In an advantageous embodiment at least one lateral rib of the rib structure passes flush into a sidewall of the housing base body. Impact loads that mainly act opposite to the traveling direction or force introduction direction are immediately transmitted without deflection into the supporting sidewall of the housing base body. The sidewall is substantially loaded exclusively within its plane or surface. Transverse force components that can cause bending loads on the sidewall are substantially prevented. Even for a thin-walled configuration a high bearing capacity or crash safety is provided.

Preferably, fastening points of the fuel filter are arranged on a rear side opposite the front side of the housing base member. In particular, at least one fastening point passes flush into a sidewall of the housing base body. In deviation from the conditions for a lateral arrangement of fastening points, the fastening points that are arranged on the rear side are pressure-loaded in the crash situation so that a high bearing capacity is provided. As in the case of the aforementioned lateral ribs of the rib structure the flush transition of the fastening point into the sidewall provides a straight bending moment-free force transmission. From the rib structure to the fastening points there exists a continuous, at least approximately straight force path with a high compensation capacity for impact loads.

The rib structure can be configured expediently in accordance with different rib patterns. Preferably, ribs of the rib structure extend in a vertical direction as well as in a transverse direction on the front side. A grid pattern is produced which, on the one hand, is of a lightweight configuration and, on the other hand, is capable of compensating the occurring impact loads areally. The generation of local force and stress peaks is avoided. In this connection, the ribs can be arranged in a triangular or honeycomb pattern. Preferably, they are arranged in a rectangular pattern so that an excellent ratio of employed material and weight relative to the obtainable protective action results.

In a preferred embodiment, at least one part of the ribs and/or the lateral ribs have a depth that is at least 50% of a corresponding free length of the ribs and/or lateral ribs and in particular is at least as large as the free length. In this way, a sufficiently fine rib pattern with high stiffness and strength is produced. It is ensured that the impact load in a crash situation acts indeed on the ribs while the intermediately positioned thin wall sections of the housing base body are protected from direct contact.

It can be expedient to arrange the ribs in such a way that their nose edges at the front side define a curved, for example, cylindrical, surface. Preferably, the nose edges, at least approximately, are positioned in a rib plane. In this way, an areal force introduction and a uniform stress distribution within the material is favored.

The rib plane positioned at the front side can be positioned perpendicularly to the traveling direction, i.e., in the plane that is defined by the vertical direction and the transverse direction. However, a slight angled position relative to the vertical direction or to the transverse direction is possible wherein these angles are preferably in a range of including +30 degrees to including −30 degrees. In this way, an optimal adaptation in regard to impact loads is possible that do not act immediately opposite to the traveling direction but also have force components in the vertical direction or in the transverse direction.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
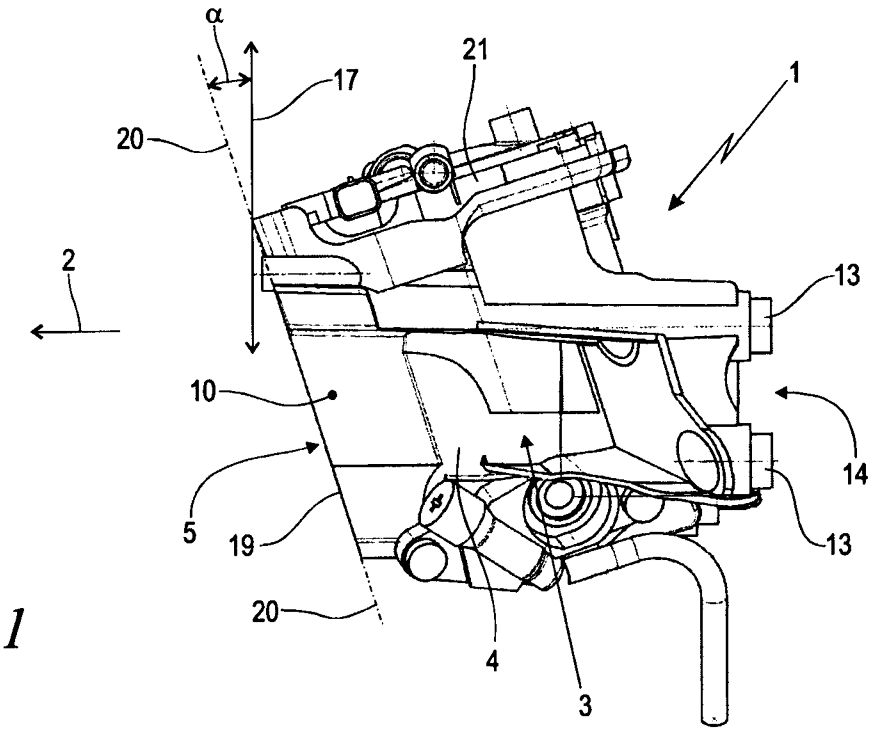
FIG. 1 shows a side view of the fuel filter according to the invention with lateral ribs of a rib structure arranged at the front side and with fastening points at the rear side.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a fuel filter having a rib structure configured to provide crash load protection as disclosed herein. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by “comprises . . . a” does not, without more constraints, preclude the existence of additional identical elements in the process, method, article, or apparatus that comprises the element.

FIG. 1 shows in a side view a fuel filter 1 of a motor vehicle embodied in accordance with the present invention. The fuel filter 1 is arranged at the front area of the engine compartment, not illustrated, wherein the traveling direction 2 of the motor vehicle is indicated by an arrow. The fuel filter 1 comprises a filter housing 3 having a filter element, not illustrated, inserted into the filter interior 22 (FIG. 2) for filtering the fuel passing through it. The filter housing 3 is comprised of a housing base body 4 and a lid 21. The lid 21 is an injection-molded plastic part but can also be produced as a die cast aluminum part or a sheet metal part. The housing base body 4 is comprised of a brittle cast material. In the illustrated embodiment die cast aluminum is selected. The housing base body 4 can also be a plastic part that is injection-molded, an aluminum extrusion part or the like. Instead of aluminum also other light metals such as magnesium or the like can be selected.

Figure 2:
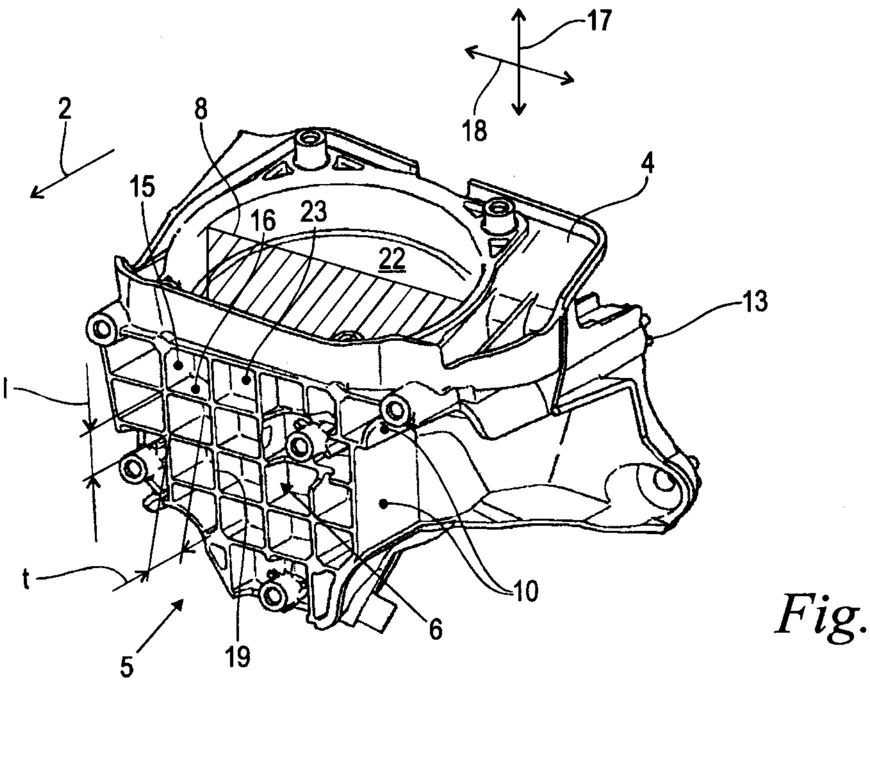
FIG. 2 is a perspective view of the housing base body according to FIG. 1 with details of a front-side rib structure.
Figure 3:
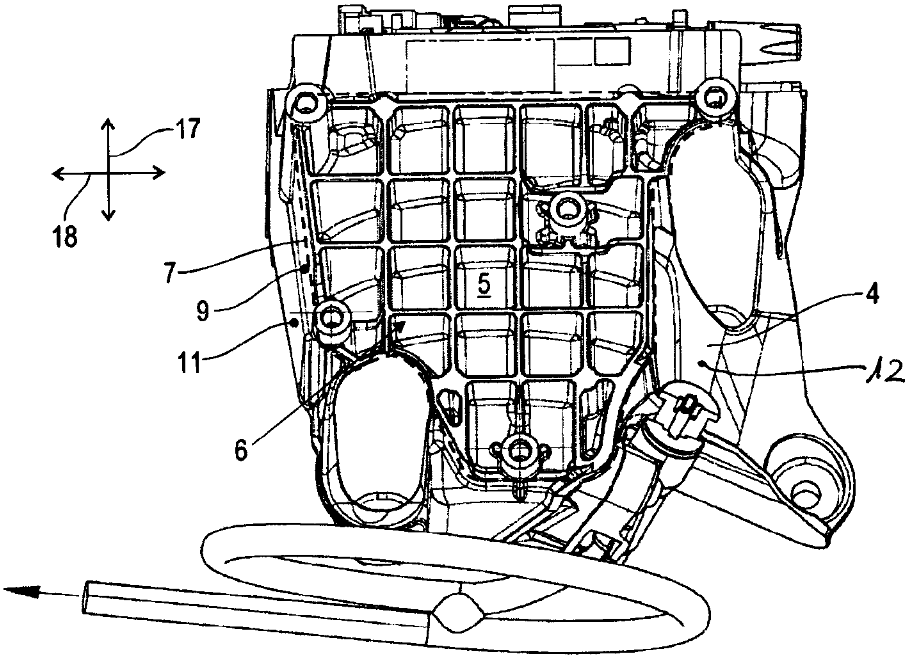
FIG. 3 is a front view of the fuel filter according to FIG. 1 with further details of the rib structure.

The housing base body 4 has a front side 5 arranged so as to face in the traveling direction 2 and comprising a rib structure 6, illustrated in FIGS. 2 and 3, as impact protection. On the rear side 14 opposite the front side 5 in the direction opposite to the traveling direction 2 the housing base body 4 has a number of fastening points 13 for stationary attachment or screw connection of the fuel filter 1 in the engine compartment.

FIG. 2 shows in perspective view the housing base body 4 of the fuel filter 1 according to FIG. 1 as an individual part. Relative to the traveling direction 2, that indicates also the longitudinal direction of the fuel filter 1 (FIG. 1), in the usual mounting position of the fuel filter 1 a vertical direction 17 and transverse direction 18 are predetermined that are perpendicular to one another and perpendicular to the traveling direction 2. A filter interior 22 of the housing base body 4 for receiving the filter element, not illustrated, is delimited in the transverse direction 18 by means of sidewalls 11, 12, illustrated in FIGS. 1 and 3, as well as by the thin-walled front wall 23 positioned forwardly in the traveling direction 2. In a direction opposite to the traveling direction 2, the filter interior 22 has a longitudinal section surface area 8 indicated by cross-hatching that extends in the vertical direction 17 and in the transverse direction 18.

The front wall 23 is reinforced on its exterior at the front side 5 by an integrally formed rib structure 6 as an impact protection which rib structure is produced by casting technology. The rib structure 6 is formed of ribs 15, 16 as well as lateral ribs 9, 10. The ribs 15, 16 and lateral ribs 9, 10 extend in the vertical direction 17 as well as in the transverse direction 18. At least the inner ribs 15 extend in the vertical direction 17 while the ribs 16 are positioned at a right angle thereto in the transverse direction 18 in such a way that a rectangular pattern is created with formation of crossing points. Between the individual crossing points the ribs 15, 16 and the lateral ribs 9, 10 have a free length 1. Moreover, they project with their leading nose edges 19 past the front wall 23 in the traveling direction 2 with a depth t. At least a part of the ribs 15, 16 and/or of the lateral ribs 9, 10 have a depth t that is at least 50% of the correlated free length l of the rips 15, 16 and/or of the lateral ribs 9, 10. The nose edges 19 are positioned in a rib plane 20 illustrated in FIG. 1 while the front wall 23 is configured in the form of a cylinder section. Accordingly, the depth t of the ribs 15, 16 increases toward the lateral ribs 9, 10 and has its maximum value at the lateral ribs 9, 10. In this lateral area, the depth t is at least as large as or even greater than the free length l.

When looking at FIGS. 1 and 2, the nose edges 19 of the ribs 15, 16 and lateral ribs 9, 10 are positioned at least approximately in a rib plane 20. The rib plane 20, relative to the vertical direction 17, is slanted by an angle $\alpha$ of approximately 15 degrees downwardly. The angle $\alpha$ is positioned expediently in a range of including +30 degrees to including −30 degrees.

FIG. 3 shows the fuel filter 1 according to FIG. 1 in a front view with the rib structure 6 arranged on the front side 5. The rib structure 6 is distributed across the rib surface area 7 that is indicated by a dashed contour line. The rib surface area 7 is at least 80%, preferably at least 100%, of the longitudinal section surface area 8 of the filter interior 22 (FIG. 2) and is even greater than it in order to develop a satisfactory protective action.

Moreover, the illustration of FIG. 3 shows that lateral rib 9 laterally positioned in the transverse direction 18 passes flush into the correlated sidewall 11 of the housing base body 4. The same holds true also for the opposite lateral rib 10 that is illustrated in FIGS. 1 and 2 and at least section-wise passes flush into the correlated sidewall 12 (FIG. 1). The two sidewalls 11, 12 as well as the correlated lateral ribs 9, 10 extend substantially in the traveling direction 2 and in the vertical direction 17.

Figure 4:
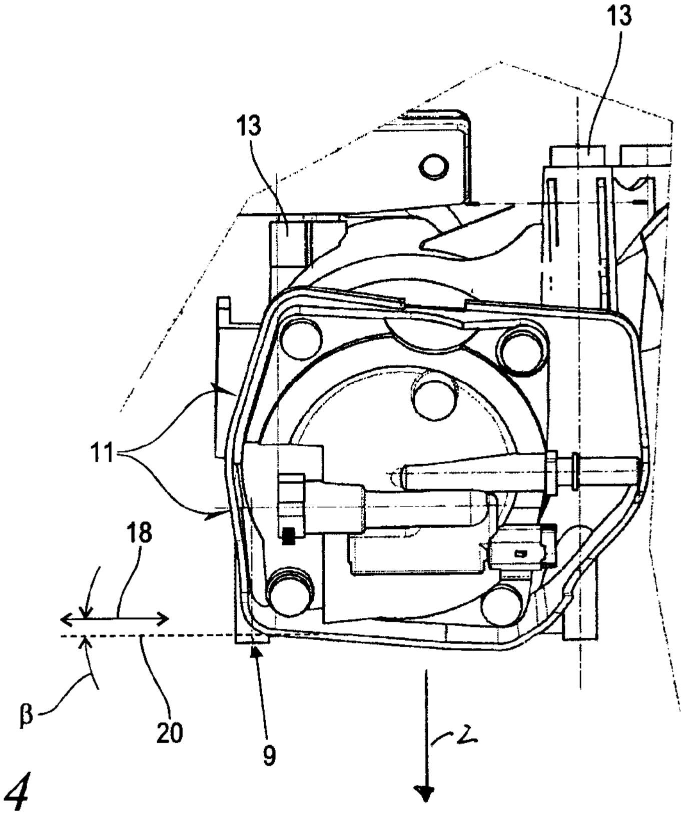
FIG. 4 is a plan view onto the fuel filter according to FIGS. 1 and 3 with details to the relative arrangement of the fastening points, the sidewalls, and the rib structure.

FIG. 4 shows in a plan view the fuel filter 1 according to FIGS. 1 and 3. FIG. 4 shows that the fastening point 13 correlated with the sidewall 11 as well as the lateral rib 9 arranged on the same side 9 pass flush into the correlated sidewall 11. The lateral rib 9, the correlated sidewall 11 and also the correlated fastening point 13 are thus positioned at least approximately in a common plane. The same holds true also, when looking at FIGS. 1 and 4, for the fastening point 13 positioned opposite in the transverse direction 18 which fastening point also passes flush into the correlated sidewall 12 as does a section of the lateral rib 10 arranged on the same side.

The illustration according to FIG. 4 also shows that the rib plane 20 is positioned at an angle $\beta$ of 0 degrees relative to the transverse direction 18. As in the case of the angle $\alpha$, the angle $\beta$ (FIG. 1) can also be expediently in a range of including +30 degrees to including −30 degrees.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A fuel filter of a motor vehicle, adapted to be mounted in a traveling direction of the motor vehicle, said fuel filter comprising:

a filter housing comprising a housing base member;

wherein said housing base member has a front side facing in said traveling direction;

wherein said front side of said housing base member comprises an external, integrally formed rib structure as an impact protection;

wherein said rib structure is distributed across a rib surface area that has a size of at least 80% of a longitudinal section surface area of a filter interior of said housing base body, viewed in a direction opposite to said traveling direction.

2. The fuel filter according to claim 1, wherein said rib surface area has a size of at least 100% of said longitudinal section surface area.

3. The fuel filter according to claim 1, wherein at least one lateral rib of said rib structure passes flush into a sidewall of said housing base body.

4. The fuel filter according to claim 1, comprising fastening points arranged on a rear side of said housing base body opposite said front side.

5. The fuel filter according to claim 4, wherein at least one of said fastening points passes flush into a sidewall of said housing base body.

6. A fuel filter of a motor vehicle, adapted to be mounted in a traveling direction of the motor vehicle, said fuel filter comprising:

a filter housing comprising a housing base member;

wherein said housing base member has a front side facing in said traveling direction;

wherein said front side of said housing base member comprises an external, integrally formed rib structure as an impact protection;

wherein said rib structure has first ribs extend in a vertical direction and second ribs extending in a transverse direction across said front side.

7. The fuel filter according to claim 6, wherein said first and second ribs of said rib structure are arranged in a rectangular pattern.

8. A fuel filter of a motor vehicle, adapted to be mounted in a traveling direction of the motor vehicle, said fuel filter comprising:

a filter housing comprising a housing base member;

wherein said housing base member has a front side facing in said traveling direction;

wherein said front side of said housing base member comprises an external, integrally formed rib structure as an impact protection;

wherein said rib structure comprises ribs and wherein at least a part of said ribs have a depth that is at least 50% of a correlated free length of said ribs.

9. The fuel filter according to claim 8, wherein some of said ribs are lateral ribs.

10. The fuel filter according to claim 8, wherein said depth of said ribs is at least as large as said free length.

11. The fuel filter according to claim 8, wherein said rib structure comprises ribs and wherein nose edges of said ribs are positioned at least approximately on a rib plane.

12. The fuel filter according to claim 11, wherein some of said ribs are lateral ribs.

13. The fuel filter according to claim 11, wherein said rib plane relative to a vertical direction of said front side is positioned at a first angle and relative to a transverse direction of said front side at a second angle, wherein said first and second angles are within a range including +30 degrees to including −30 degrees.

* * * * *